April 14, 1925.
W. C. TOOMEY
MOVABLE HEADLIGHT
Filed June 16, 1923
1,533,957
2 Sheets-Sheet 1
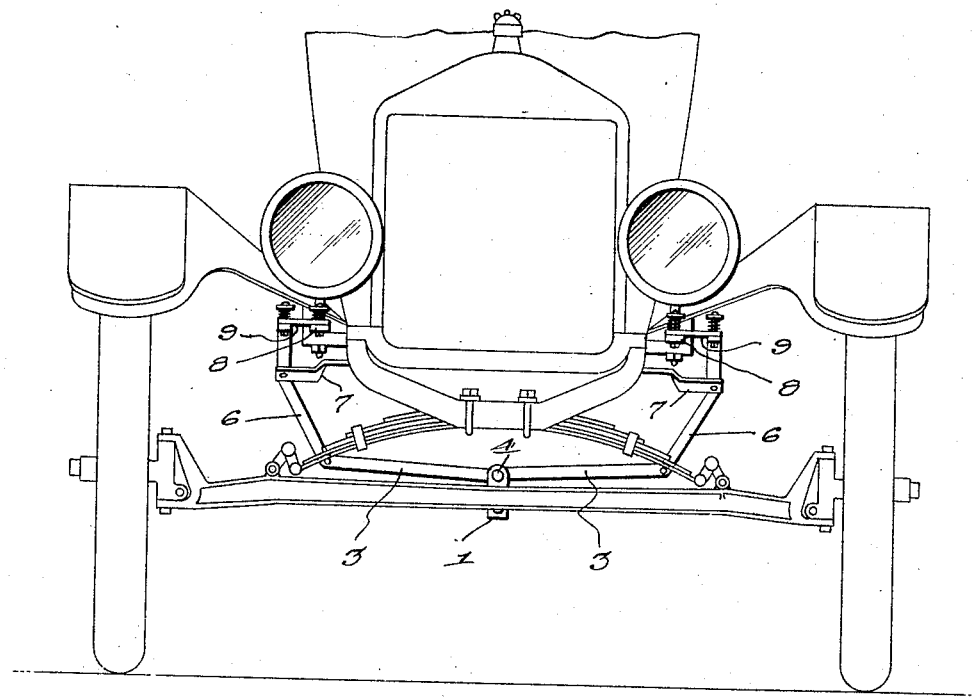
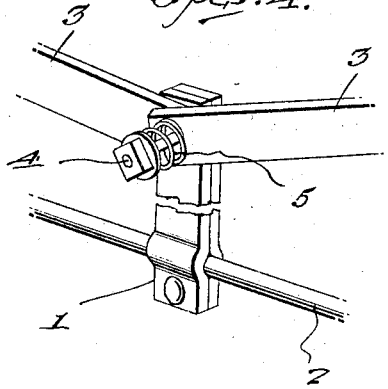
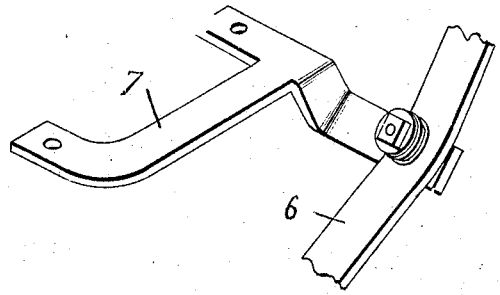
Wm. C. Toomey, INVENTOR
BY Victor J. Evans
ATTORNEY April 14, 1925.
W. C. TOOMEY
MOVABLE HEADLIGHT
Filed June 16, 1923
1,533,957
2 Sheets-Sheet 2
Fig. 2.
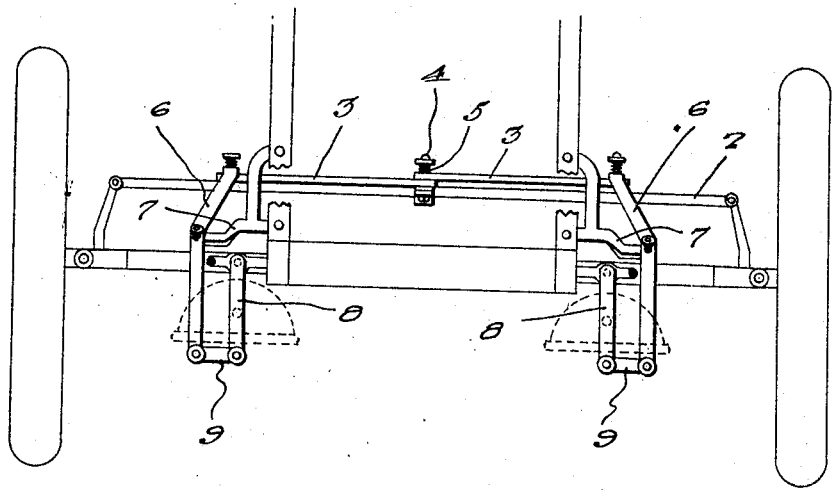
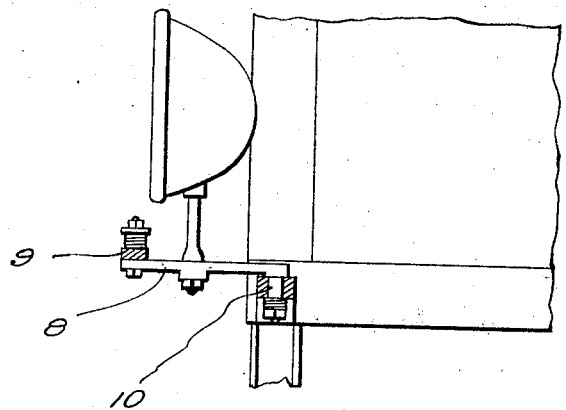
Fig. 3.
Wm. C. Toomey INVENTOR
BY Victor J. Evans
ATTORNEY
WITNESS:

UNITED STATES PATENT OFFICE.

WILLIAM C. TOOMEY, OF HARRISBURG, PENNSYLVANIA.

MOVABLE HEADLIGHT.

Application filed June 16, 1923. Serial No. 645,903.

*To all whom it may concern:*

Be it known that I, WILLIAM C. TOOMEY, a citizen of the United States, residing at Harrisburg, in the county of Dauphin and State of Pennsylvania, have invented new and useful Improvements in Movable Headlights, of which the following is a specification.

The object of this invention is to provide means for causing the head lamps of a motor vehicle to move with the front wheels so as to cause the light of the lamps to follow the road at all times.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a front view of a vehicle provided with my invention.

Figure 2 is a plan view with parts omitted.

Figures 3, 4 and 5 are detail views of the attachment.

In these views 1 indicates a clamp which is fastened to the cross rod 2 of the vehicle. A pair of arms 3 is pivotally connected with the clamp by means of the bolt 4 upon which a spring 5 is placed to prevent rattling. A lever 6 is pivotally connected with the outer end of each arm by means of a bolt and spring and each lever is pivotally connected by means of a bolt and spring to a bracket 7 which is bolted to the frame of the car. Each lamp is carried by a flat bar 8 which is connected with the upper end of each lever 6 by means of the link 9. Each bar is provided with a depending part 10 which engages the hole formally occupied by the lamp standard. All the pivot bolts are provided with springs, such as shown at 5, for preventing rattling and lost motion.

From the above it will be seen that as the steering mechanism is manipulated to turn the front wheels this movement will be communicated to the lamps through the radius rod and the attached parts which form my invention so that the lamps will move with the front wheels and thus cause the rays of light to follow the road on curves as well as straight portions.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a motor vehicle, a horizontal supporting bar for each lamp thereof, each bar having a depending part at one end for engaging the hole formally occupied by the lamp standard, a substantially T-shaped bracket fastened to each side of the vehicle frame adjacent the front thereof, a lever pivoted intermediate its ends to each bracket, a link connecting the forward end of each lever with the forward end of each lamp supporting bar, a clamp carried by the cross bar of the steering mechanism of the vehicle, an arm connecting the rear end of each lever with said clamp and springs at the pivotal points of the members.

WILLIAM C. TOOMEY.